3,068,147
ANALGESIC COMPOSITIONS CONTAINING o-PRO-
POXYBENZAMIDE WITH SALICYLAMIDE OR
ACETYL - p - AMINOPHENOL OR MIXTURES
THEREOF
Jane F. Emele, Morris Plains, N.J., assignor to Warner-
Lambert Pharmaceutical Company, Morris Plains, N.J.,
a corporation of Delaware
No Drawing. Filed Nov. 19, 1958, Ser. No. 774,812
4 Claims. (Cl. 167—65)

This invention relates to pharmaceutical compositions comprising o-propoxybenzamide

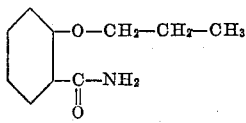

and in particular relates to pharmaceutical compositions for oral and parenteral administration comprising the combination of o-propoxybenzamide with an analgesic compound selected from the group consisting of salicylamide, acetyl-p-aminophenol and mixtures of salicylamide with acetyl-p-aminophenol. Application S. No. 774,813, filed November 19, 1958, discloses pharmaceutical compositions comprising the combination of o-ethoxybenzamide with salicylamide and with mixtures of salicylamide and acetyl-p-aminophenol.

Compositions containing acetyl salicylic acid have been known for many years and have been widely used as analgesics in the relief of pain associated with headache, neuralgia and the like and as antipyretics. The use of aspirin has, on occasion, been associated with undesirable side-effects and in recent years there has been considerable interest in developing new and improved analgesic and antipyretic compounds. In current medical research such materials as salicylamide and acetyl-p-aminophenol have been extensively investigated as substitutes for aspirin.

It has now been discovered that compositions comprising as active analgesic ingredients a combination of o-propoxybenzamide with a member selected from the group consisting of salicylamide, acetyl-p-aminophenol and mixtures of salicylamide and acetyl-p-aminophenol are excellent analgesics and antipyretics and exhibit an unexpected synergistic effect above and beyond the expected additive analgesic effect of the components comprising said compositions. This discovery of this unexpected synergism is not only useful but its application in therapeutics is highly desirable since it enables smaller quantities of the individual analgesics to be used to produce a given analgesic effect thus minimizing the possibility of any undesirable side effects due to dosage levels or individual sensitivity.

The compositions prepared in accordance with this invention, in addition to the analgesics, may include a suitable pharmaceutical carrier to form dosage unit forms such as tablets, capsules, syrups, elixirs, parenteral solutions and suspensions, as well as suppositories and the like. The combined active analgesic ingredients in a dosage unit will normally be from about 100 to about 750 milligrams. The ratio by weight in which each is present in the composition will normally be from about 5 to about 200 parts by weight of o-propoxybenzamide per 100 parts by weight of salicylamide, acetyl-p-aminophenol or of the mixtures of salicylamide and acetyl-p-aminophenol employed.

o-Propoxybenzamide can be easily prepared by treating salicylamide with n-propyl bromide in an alcohol solution in the presence of sodium propoxide as catalyst. The n-propyl ether of salicylamide, that is o-propoxybenzamide, can be precipitated from the reaction mixture in good yields by the addition of water.

The procedure best suited to the determination of the analgesic activity of a compound is a modification of that described by E. A. Siegmund et al., J. Pharmacol. and Exper. Therap., 119, p. 184 (1957). Female mice weighing 18 to 24 grams are used. The "writhing syndrome," which is characterized by periodic twisting of the lower half of the trunk, contractions of the muscles in the pelvic area and extension of the hind legs with elevation of the base of the tail, is produced by the intraperitoneal injection of 0.25 cc. of a 0.02% solution of phenyl-p-quinone in 5% ethyl alcohol. All mice writhe within 10 minutes after administration of phenyl-p-quinone. In carrying out the test, three groups of ten mice each are used. A different dose of the analgesic to be investigated is administered orally to each group. 15 minutes later, each group is challenged with phenylquinone. A dose response curve is obtained by basing observations on an all-or-none response during the 10 minute period after injection of phenylquinone. The amount of the analgesic, expressed as milligrams per kilogram of body weight at which 50% of the test mice show no writhing is determined from the dose response curve and reported as the $ED_{50}$ (effective dose) for the material being studied. This test procedure affords a reliable and convenient method for evaluating the analgesic properties of various compounds. The lower the $ED_{50}$, the more effective the material is as an analgesic.

The $ED_{50}$ for each of the following compounds as determined by the above described test procedure are tabulated below.

TABLE I

| Compound: | $ED_{50}$ (mg./kg.) |
|---|---|
| Acetyl-p-aminophenol | 280 |
| Salicylamide | 200 |
| o-Propoxybenzamide | 150 |

The following table presents the results of tests of the analgesic activity of compositions comprising o-propoxybenzamide as evaluated by the phenylquinone writhing test in mice described above. Each composition is the $ED_{50}$ (mg./kg.) dose, or is that amount of the composition necessary to prevent writhing in 50% of the test mice. The quantity of each compound in the compositions is also shown as a fraction of the $ED_{50}$ (mg./kg.) amount for the respective compounds as tabulated in Table I.

TABLE II

| Composition | Amount of compound (mg./kg.) | Fraction of $ED_{50}$ amount for compound | Synergism |
|---|---|---|---|
| A. o-propoxybenzamide | 35 | 0.23 | |
| acetyl-p-aminophenol | 140 | 0.50 | |
| Sum of fractions | | 0.73 | Yes |
| B. o-propoxybenzamide | 36 | 0.24 | |
| salicylamide | 100 | 0.50 | |
| Sum of fractions | | 0.74 | Yes |
| C. o-propoxybenzamide | 10 | 0.07 | |
| salicylamide | 50 | 0.25 | |
| acetyl-p-aminophenol | 70 | 0.25 | |
| Sum of fractions | | 0.57 | Yes |

The results shown in Table II establish the synergistic effect achieved with combinations of o-propoxybenzamide with salicylamide, or with acetyl-p-aminophenol as well as with mixtures of salicylamide and acetyl-p-aminophenol. The synergism is clearly demonstrated by the fact that the sum of the fractions of the $ED_{50}$ for each compound in the compositions is less than one.

In order further to illustrate this invention the following examples are given:

*Example I*

Salicylamide, 137 grams, is reacted for 6 hours with 123 grams of n-propyl bromide in boiling alcohol in the presence of 82 grams of sodium propoxide. The alcohol is removed by distillation and the product precipitated by the addition of water. The product is recrystallized from 50 percent aqueous alcohol. A yield of 120 grams of o-propoxybenzamide, melting point 102° C., is obtained.

*Example II*

Tablets:                                                G.
   o-Propoxybenzamide _____ 150
   Salicylamide _____ 350
   Methylcellulose _____ 30
   Starch _____ 30
   Stearic acid_____ 6
   Starch _____ 34
   Guar gum_____ 12

The first four ingredients are blended, granulated with 160 ml. water, air-dried and screened through No. 16 screen. The last three ingredients are added, blended and the mixture compressed into 612 mg. tablets, each containing 150 mg. o-propoxybenzamide and 350 mg. salicylamide.

*Example III*

Tablets:                                                G.
   o-Propoxybenzamide _____ 10
   Salicylamide _____ 50
   Acetyl-p-aminophenol _____ 70
   Starch _____ 17
   Stearic acid_____ 3
   Starch _____ 7

The first four ingredients are blended, granulated with 60 ml. of water, air dried and screened through a No. 16 screen. The last two ingredients are added, blended and the mixture compressed into 157 mg. tablets, each tablet containing 10 mg. o-propoxybenzamide, 50 mg. salicylamide and 70 mg. acetyl-p-aminophenol.

*Example IV*

Tablets:                                                G.
   o-Propoxybenzamide _____ 150
   Acetyl-p-aminophenol _____ 350
   Methylcellulose _____ 30
   Starch _____ 30
   Stearic acid_____ 6
   Starch _____ 34
   Guar gum_____ 12

The first four ingredients are blended, granulated with 160 ml. water, air dried and screened through No. 16 screen. The last three ingredients are added, blended and the mixture compressed into 612 mg. tablets, each containing 150 mg. o-propoxybenzamide and 350 mg. acetyl-p-aminophenol.

*Example V*

Capsules:                                               G.
   o-Propoxybenzamide _____ 30
   Salicylamide _____ 110
   Acetyl-p-aminophenol _____ 160

The ingredients are ground, blended and triple screened through a No. 80 screen. No. 1 colorless hard gelatin capsules are each filled with 300 mg. of the blend, each capsule containing 30 mg. o-propoxybenzamide, 110 mg. salicylamide and 160 mg. acetyl-p-aminophenol.

*Example VI*

Capsules:                                               G.
   o-Propoxybenzamide _____ 75
   Salicylamide _____ 250

The ingredients are blended, ground and triple screened through a No. 80 screen. No. 1 hard gelatin capsules are each filled with 325 mg. of blend, each capsule containing 75 mg. o-propoxybenzamide and 250 mg. salicylamide.

*Example VII*

Suppositories:                                          G.
   o-Propoxybenzamide _____ 125
   Salicylamide _____ 250
   Cocoa butter_____ 1950

The first two ingredients are stirred into molten cocoa butter and mixed thoroughly. The mixture is poured into chilled suppository molds and allowed to solidify. Each suppository (2.3 g.) contains 125 mg. o-propoxybenzamide and 250 mg. salicylamide.

Any departure from the foregoing description that conforms to the present invention is intended to be included within the scope of the claims.

I claim:

1. An analgesic composition containing a solid pharmaceutical carrier and as active ingredients a mixture of o-propoxybenzamide together with as an added component at least one member of the group consisting of salicylamide and acetyl-p-aminophenol, said o-propoxybenzamide being present in the relative proportions of about 5 to about 200 parts by weight for every 100 parts by weight of said added component, the mixture of active ingredients being present in said analgesic composition in an amount of from about 100 to about 750 milligrams per dosage unit.

2. An analgesic composition according to claim 1 wherein the active ingredients consist of a mixture of o-propoxybenzamide and salicylamide.

3. An analgesic composition according to claim 1 wherein the active ingredients consist of a mixture of o-propoxybenzamide and acetyl-p-aminophenol.

4. An analgesic composition according to claim 1 wherein the active ingredients consist of a mixture of o-propoxybenzamide with both salicylamide and acetyl-p-aminophenol.

References Cited in the file of this patent

UNITED STATES PATENTS

| | | |
|---|---|---|
| 2,694,088 | Sahyun et al. | Nov. 9, 1954 |
| 2,744,916 | Sahyun et al. | May 8, 1956 |
| 2,754,327 | Sahyun et al. | July 10, 1956 |
| 2,764,614 | Meyer | Sept. 25, 1956 |
| 2,822,391 | Suter et al. | Feb. 4, 1958 |
| 2,872,370 | Berger | Feb. 3, 1959 |

OTHER REFERENCES

CA (1), 47:8038(c), 1953, Bavin et al., J. Pharm. and Pharmacol. 4, 872–8 discussion 878 (1952).

CA (92), 50:5751(i), 1956, Herts Pharmaceuticals Ltd., Florence et al., Brit., 726–786, March 23, 1955.

Randall et al.: J.A.P.A., Sci. Ed., vol. 47, No. 5, May 1958, pp. 313–314.

Boxill et al.: J.A.P.A., Sci. Ed., vol. 47, No. 7, July 1958, pp. 479–487.

Coates et al.: J. Pharm. and Pharmacol., December 1957, pp. 855–863.